United States Patent
Spaderna

Patent Number: 5,687,131
Date of Patent: Nov. 11, 1997

[54] MULTI-MODE CACHE STRUCTURE

[75] Inventor: Dieter Spaderna, Portland, Oreg.

[73] Assignees: Sharp Microelectronics Technology, Inc., Camas, Wash.; Sharp Kabushiki Kaisha, Osaka, Japan

[21] Appl. No.: 621,010

[22] Filed: Mar. 22, 1996

[51] Int. Cl.⁶ ............................................. G11C 13/00
[52] U.S. Cl. ........................ 365/230.01; 365/189.07; 365/230.08
[58] Field of Search ............... 365/189.01, 189.05, 365/189.07, 189.08, 230.01, 230.03, 230.08

[56] References Cited

U.S. PATENT DOCUMENTS 5,363,330  11/1994  Kobayashi et al. ................. 365/189.07

OTHER PUBLICATIONS

"The ARM RISC Chip, A Programmer's Guide" Alex van Someren & Carol Atack, 1993, pp. 21–35, Addison–Wesley Publishing Company.

"ARM7DI Data Sheet" Advanced RISC Machines Ltd. (ARM), Dec., 1994, pp. ii, 15–18, 81–90, 119–129.

"ARM Software Development Toolkit 2.0" Advanced RISC Machines Ltd. (ARM), prior to Jan. 1, 1996, 3 pages.

"An Introduction to Thumb" Advanced RISC Machines Ltd. (ARM), Mar. 1995, pp. 9–14.

*Primary Examiner*—Terrell W. Fears
*Attorney, Agent, or Firm*—David C. Ripma; Gerald W. Maliszewski

[57] ABSTRACT

A multimode cache structure includes a predefined block of memory and controls for that block of memory which allow the memory block to perform multiple functions. The selectable, multiple functions include a cache mode, a SRAM mode, a flush mode and an invalidate mode. A control register is defined and is associated with the predefined memory block, which control register includes multiple status bits therein. Each of the status bits corresponds to one of the multiple functions and, when a particular status bit is set, the predefined block of memory performs a function corresponding to the status bit that is set.

12 Claims, 2 Drawing Sheets

MULTI-MODE CACHE STRUCTURE

FIELD OF THE INVENTION

The invention relates to integrated circuits, and specifically to an integrated circuit which includes a reduced instruction set computer (RISC) central processing unit (CPU) which is intended for use in portable devices which incorporates a block of on-chip memory which may be used as a cache or as RAM.

BACKGROUND OF THE INVENTION

Portable devices include electronic instruments such as personal information manager, cellular telephones, digital cameras, hand-held games, bar-code scanners, medical equipment, electronic instrumentation, and navigation systems, specifically global positioning satellite navigation systems.

To be commercially successful, portable devices require integrated circuits which are low in cost, have low power requirements to insure long battery life, and have high standards of performance to insure that their output is accurate and usable. Additionally, the interface between the integrated circuit and the remainder of the portable device must be of a plug-and-play design so that a single type of integrated circuit may be used with a number of portable devices. Part of such flexibility is that the designer of a portable device must be able to easily incorporate the IC into the device as an off-the-shelf component, which does not require any internal modification to be used in a variety of applications.

The "computing power" found in integrated circuit CPUs, such as the Intel 30*86 and Pentium® series chips, and the Motorola 68000 series chips, has increased significantly over the last few years. At the same time, the size of such chips has grown significantly, as has their power requirements. Such chips are designated as conventional instruction set computers (CISC) and have come to require significant blocks of associated random access memory (RAM) while the applications that have been written to run on computers containing these chips have grown, seemingly without limit, requiring vast amounts of hard drive space. Such CISC devices are not easily usable with portable devices due to their power requirements and size.

Reduced instruction set computers (RISC) were originally used in high-end graphics applications, and in CAE/CAD work stations. The RISC architecture, however, enables an IC to have a significantly smaller die size, because the smaller instruction set of the RISC technology requires fewer transistors to implement, which leads to simpler designs which consequently take less time to complete and to debug. Additionally, smaller chips having shorter signal paths mean that each instruction cycle is of a shorter duration. The relative size of a RISC CPU is significantly smaller than a CISC CPU, for instance, the Intel 386 SL chip is approximately 170 mm$^2$, while a RISC chip having similar computational abilities is slightly more than 5 mm$^2$.

The small size of RISC-based CPUs makes the RISC architecture ideal for "system-on-chip" (SOC) applications, wherein the CPU and a number of other structures are located on a single chip. Such a SOC architecture may result in a chip that is still considerably smaller than a CISC CPU, but which contains all of the computational and control structures on a single integrated circuit. A SOC architecture will generally include the RISC CPU and some type of local RAM and/or data cache. Additionally, the chip may include internal and external bus controllers, various types of communication ports, an interrupt controller, and pulse width modulator, various configuration registers, various timer/counter structures, and some type of output controller, such as an LCD controller. Such a structure may be configured in a 32-bit architecture, with associated peripherals integrated onto the chip, which integration allows the designer of the portable device incorporating the chip to reduce the development cycle and accelerate the product introduction to market. The chip structure may have an external 16-bit data bus with an integrated, programmable bus controller capable of supporting 8 or 16-bit SRAM, DRAM, EPROM and/or memory devices, which do not require additional buffers in order to function with the integrated circuit. The chip may be operated at either 3.3 volts or 5 volts, which will require between 100 mW and 350 mW, respectively.

By combining a number of peripherals on the chip, and providing an internal bus amongst the CPU and peripherals, it is possible to conduct a number of operations on chip, while simultaneously controlling off-chip operations, such as memory stores and retrieves.

The integrated circuit may include a memory interface which provides multiple programmable chip enables, allowing users to set wait states and memory width, 8 or 16-bits wide. The integrated circuit provides for address decoding and DRAM control logic, which allows an external bus master to perform data transfers without requiring external address decoding or external DRAM controllers. In the case where sequential accesses are being used, the integrated circuit automatically increments the initial memory address supplied by the external bus master, thereby speeding transfers.

The specific subject of the instant application is a multi-mode cache structure which includes a predefined block of memory and controls for that block of memory which allow the memory block to perform multiple functions. The selectable, multiple functions include a cache mode, a SRAM mode, a flush mode and an invalidate mode. A control register is defined and is associated with the predefined memory block, which control register includes multiple status bits therein. Each of the status bits corresponds to one of the multiple functions and, when a particular status bit is set, the predefined block of memory performs a function corresponding to the status bit that is set.

An object of the invention is to provide an integrated circuit having a CPU wherein a block of memory is capable of performing more than one function.

Another object of the invention is to provide a memory block that may act as a cache or as a SRAM.

Another object of the invention is to provide an integrated circuit having a CPU which allows a user to select the functions of memory blocks on the integrated circuit.

These and other objects and advantages of the invention will become more fully apparent as the description which follows is read in connection with the drawings.

BEST MODE OF PRACTICING THE INVENTION

Figure 1:
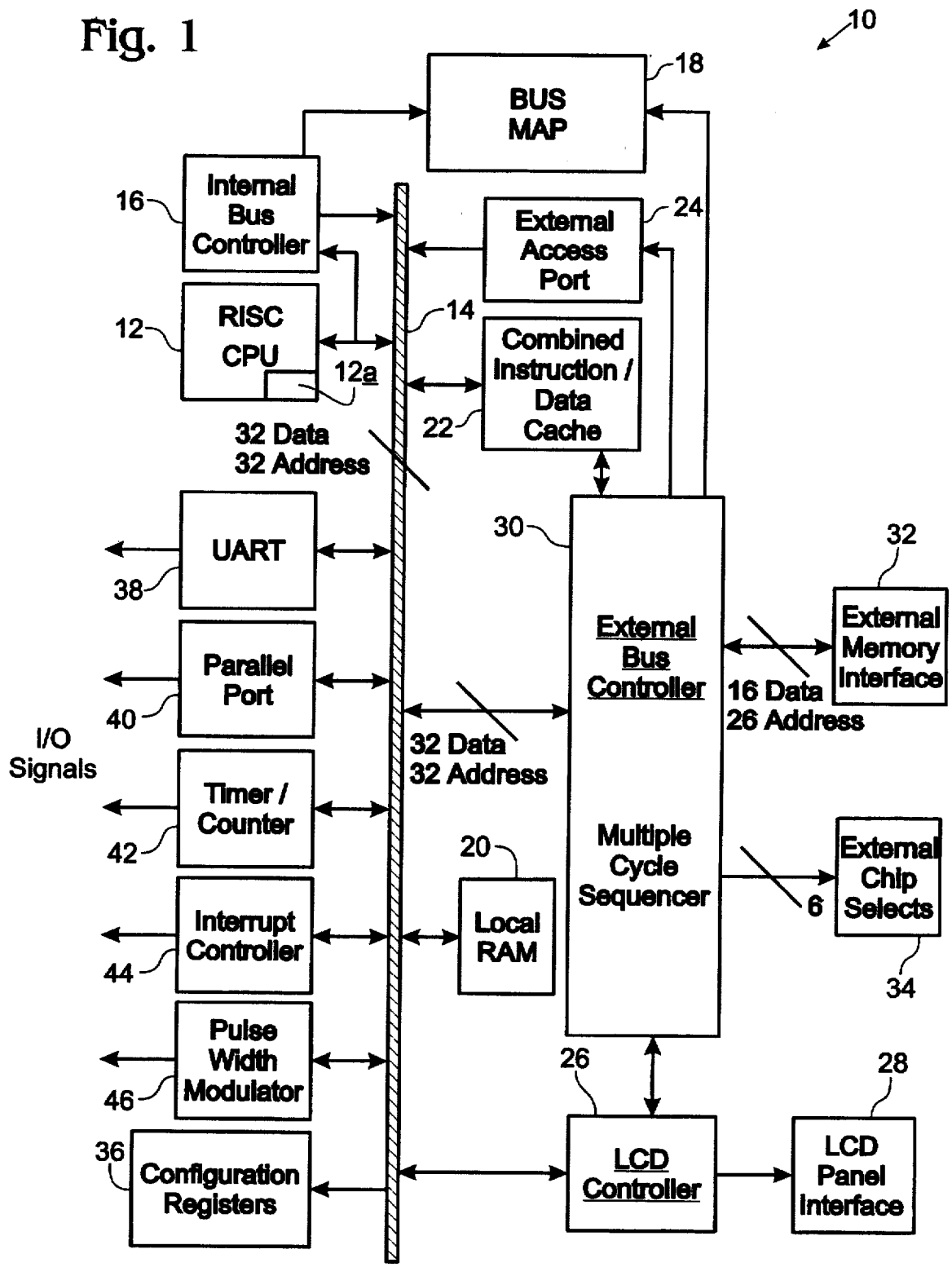
FIG. 1 is block diagram of the system on chip structure of the invention.

Referring initially to FIG. 1, a system-on-chip (SOC) structure of the invention is depicted generally at 10. IC 10 includes a RISC CPU 12, which may include an embedded microcontroller 12a therefor, which is connected to a 32-bit internal bus 14. CPU 12 is directly connected to internal bus controller 16, which in turn is connected to bus 14 and to a bus map 18. IC 10 further includes a local RAM (SRAM) 20, a combined instruction/data cache 22, also referred to herein as a predefined block of memory, and an external access port 24. In the preferred embodiment, IC 10 is intended to connect to a liquid crystal display (LCD) and to that end, includes a LCD controller 26 which is connected to an LCD panel interface 28. An external bus controller 30 is provided and is connected to an external memory interface 32 and external chip selects 34, which, in the preferred embodiment, are part of external bus controller 30. Memory interface 28 and external chip selects 34 are connected by various buses to external memory, which may include SRAM and DRAM portions (not shown) and to various peripheral devices, such as I/O devices, hard drives, etc.

A number of configuration registers 36 are provided, which may be located in internal bus controller 16. A number of on-chip internal "peripherals" are connected to internal bus 14, and include a universal asynchronous receiver/transmitter (UART) 38, a parallel port 40, a timer/counter 42, an interrupt controller 44, and a pulse width modulator (PWM) 46.

Figure 2:
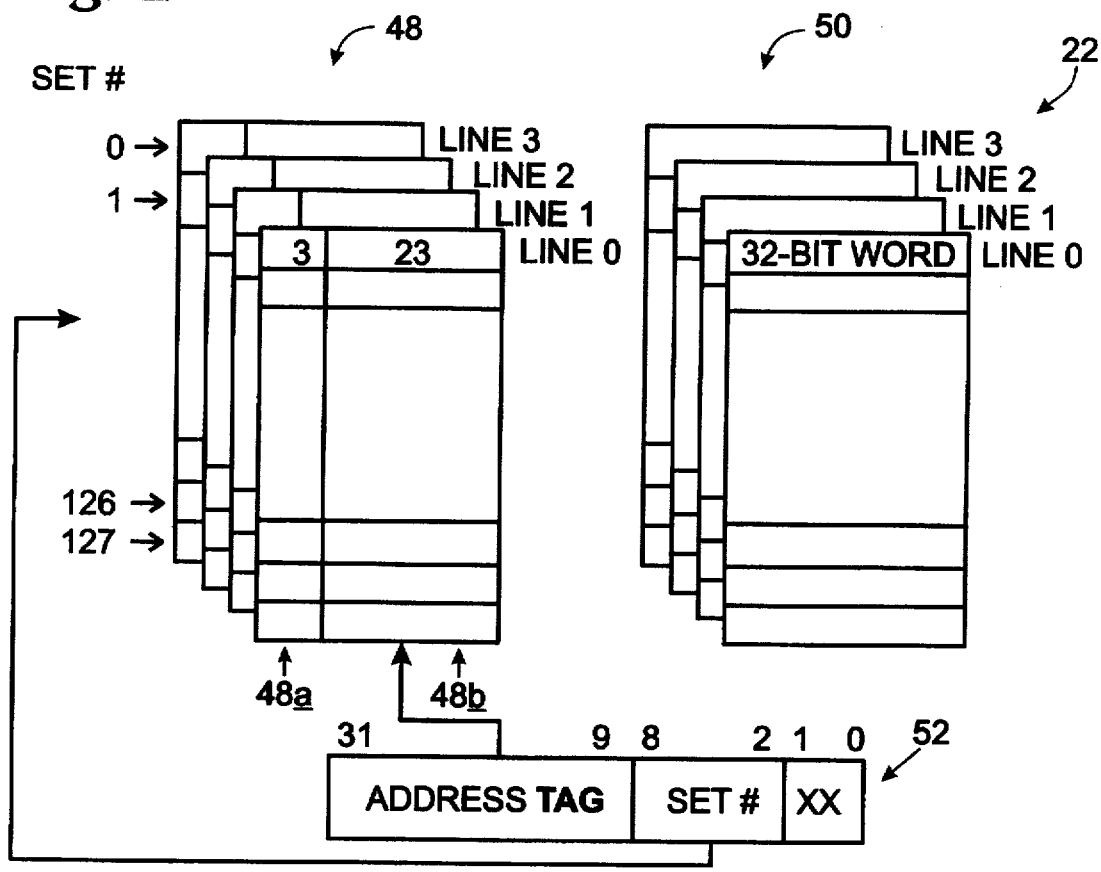
FIG. 2 is a block diagram of a memory block in a cache mode.

Referring now to FIG. 2, a combined instruction/data cache is depicted in greater detail. As previously noted, the block of memory which makes up cache 22 is divided into two portions: the first portion is a Tag RAM portion 48, and the second portion is a data RAM portion 50. Associated with memory block 22 is a cache control register 52 which, in the preferred embodiment, is located in internal bus controller 16.

Cache 22, in the preferred embodiment, is a 2K-byte cache. The cache is 4-way set associative, with 128 sets, as indicated in FIG. 2 by sets 0–127. In the preferred embodiment, each set includes four 1-word lines of cached data, with each line capable of storing a 32-bit word in data RAM portion 50 of memory block 22. Each set also includes four lines of 3-bit status 48a, and 23-bit address 48b in the Tag RAM portion of memory block 22.

Status bits 48a include an M-bit which indicates whether or not the data in the cache line has been modified or not, which is set to 0 when data and the associated address is written into the line, and which is set to 1 if the data is modified. A second status bit is a V-bit, which indicates whether the data is valid or not. If the V-bit is set to 1, the indication is that the data associated therewith is valid, if the V-bit is set to 0, the data is considered to be invalid. The third bit is a least recently used (LRU) bit, and is used to trace the history of the sets in the cache.

Address register 52 is a 32-bit register. Bits 1 and 0 are not used. Bits 2 through 8 are used to identify the set number (0–127) while bits 9 through 31 provide the address in Tag RAM 48a.

In normal operation, an address is transferred from RISC CPU 12 to address register 52. The four lines in Tag RAM 48 are interrogated in parallel. If any of the four lines match the address tag in address register 52, the corresponding data from data RAM 50 is output. Memory block 22, when functioning as a cache, uses a write-back protocol. When a cache write occurs, the entry is marked as modified, by the appropriate status bit. When that entry is later replaced, the main memory (off chip) is updated. The write-back protocol reduces the traffic over internal bus 14 and through external bus controller 30, however, the main memory is left with old data until it is updated by the cache.

Figure 3:
FIG. 3 is a representation of a control register of the invention.
Figure 4:
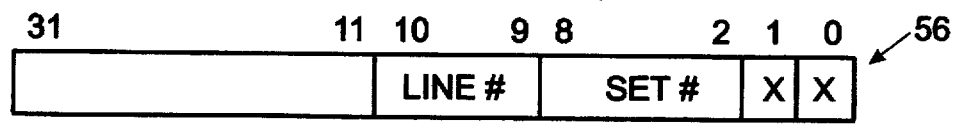
FIG. 4 is a representation of a segment descriptor register of the invention.

Referring momentarily to FIG. 3, cache control register (CCR) 54, which is located in internal bus controller 16, in the preferred embodiment, is an 8-bit register which controls the functionality of memory block 22. Only four bits of the register are used, and those four bits are designated as E, S, F, and I. When the E-bit is set to logical 1, the cache mode of memory block 22 is enabled. When the S-bit of register 54 is set to logical 1, the SRAM mode is enabled. When the F-bit of register 54 is set to 1, the flush mode is enabled. When the I-bit of register 54 is set to logical 1, the cache is declared to be invalid. Bits E, F and S of register 54 are mutually exclusive, i.e., only one of them may be set to logical 1 at any time. Memory block 22 is placed in cache mode following a reset operation.

Referring back to FIG. 2, a segment descriptor register (SDR) is depicted at 56. SDR 56 is used when bit S if CCR 54 is set to logical 1, and memory block 22 is in its SRAM, unified storage region, mode. Again, bits 0 and 1 of SDR 56 are not used. Bits 2–8 determine which set is to be addressed, and bits 9 and 10 determine which line is to be addressed. Bits 11–31 provide the address locations in memory block 22 which are to be addressed. When memory block 22 is in the SRAM mode, Tag RAM 48 and Data RAM 50 are accessed as a 1K-word SRAM. This feature allows a system designer to use memory block 22 as an extra on-chip SRAM, and also allows the designer to examine the cached data, the address tags and the status bits. When memory block 22 is in SRAM mode, the data RAM, which is 512 words long in the preferred embodiment, will map to the initial address locations, and the Tag RAM, which is also 512 words long, will map to the sequential address locations. Although each line of the Tag RAM is only 26 bits wide, the Tag RAM lines will be accessed as if they were a 32-bit word, with six zeros appended to the left (right justified) of the 3-bit status and 23-bit address tag. All accesses to memory block 22 in SRAM mode must be of word length, as byte accesses are not allowed in the preferred embodiment.

The other modes, i.e., flush mode and invalidate mode, are used to manage memory block 22. When block 22 is in flush mode, any access to a cache set wherein any of the four lines thereof have been modified, will result in the modified line(s) being written back to main memory. Therefore, the contents of the cache may be forced into main memory by accessing all 128 sets in the cache sequentially. This feature is particularly well-suited for direct memory access (DMA) protocols on a chacheable memory segment.

If the cache is in invalidate mode, all of the lines in the cache are invalidated. Any memory access by CPU 12 will be forced to go to main memory (off-chip).

Thus, a memory block for use with a RISC CPU has been disclosed, wherein the memory block may be used as a cache or as a SRAM. In the case when the memory block is used as a cache, it provides a zero-wait state on the chip whenever a cache hit occurs, and minimizes delays on cache misses. Memory updates are done in a write-back protocol to reduce traffic on the external bus. The cache uses an LRU algorithm for any replacement protocol. When the memory block is in a SRAM mode, it provides extra on-chip RAM for use in suitable applications. Such applications may make use of memory block 22 for RAM functions when the application which is being run does not require rapid access to cached data. Such applications may be used in portable devices such as digital cameras and peripheral controllers in which on-chip SRAM is more important than the caching of programming instructions.

Although a preferred embodiment of multimode cache structure has been disclosed herein, it should be appreciated that further variations and modifications may be made thereto without departing from the scope of the invention, as defined in the appended claims.

I claim:

1. In an integrated circuit having a CPU, and having a connection to a main memory unit, a multimode cache structure comprising:

a predefined block of memory which is shiftable between multiple functions, including a cache mode, wherein multiple cache sets, each having multiple cache lines, are stored in said predefined memory block, a SRAM mode, a flush mode and an invalidate mode, and wherein said control register includes designated status bits therein for said cache mode, said SRAM mode, said flush mode and said invalidate mode, and wherein said cache mode, said SRAM mode and said flush mode are mutually exclusive functions; and a control register associated with said predefined memory block having multiple status bits therein, wherein each of said status bits corresponds to one of said multiple functions, and wherein, with a status bit set, said predefined block of memory performs a function corresponding to the status bit that is set.

2. The multimode cache of claim 1 wherein said predefined memory block, when in said cache mode, includes a Tag RAM portion and a data RAM portion, and wherein said predefined memory block, when in said SRAM mode, includes a unified storage region.

3. The multimode cache of claim 1 wherein, with said predefined memory block in said flush mode, access to a cache set that has been modified since a previous access causes the modified cache set to be written to main memory.

4. The multimode cache of claim 1 wherein said predefined memory block, when in said cache mode, includes a Tag RAM portion and a data RAM portion, and wherein said predefined memory block, when in said SRAM mode, includes a unified storage region, wherein said control register, with said predefined memory block in said SRAM mode, is a segment descriptor register.

5. The multimode cache of claim 1 wherein said predefined memory block is in said cache mode following a reset operation.

6. The multimode cache of claim 1 wherein accesses are in word-length units when said predefined memory block is in said SRAM mode.

7. In an integrated circuit having a CPU, and having a connection to a main memory unit, a multimode cache structure comprising:

a predefined block of memory which is shiftable between multiple functions, including a cache mode, wherein multiple cache sets, each having multiple cache lines, are stored in said predefined memory block, a SRAM mode, a flush mode and an invalidate mode, and wherein said control register includes designated status bits therein for said cache mode, said SRAM mode, said flush mode and said invalidate mode, and wherein said cache mode, said SRAM mode and said flush mode are mutually exclusive functions, and wherein said predefined memory block, when in said cache mode, includes a Tag RAM portion and a data RAM portion, and wherein said predefined memory block, when in said SRAM mode, includes a unified storage region; and a control register associated with said predefined memory block having multiple status bits therein, wherein each of said status bits corresponds to one of said multiple functions, and wherein, with a status bit set, said predefined block of memory performs a function corresponding to the status bit that is set.

8. The multimode cache of claim 7 wherein said control register, with said predefined memory block in said SRAM mode, is a segment descriptor register.

9. The multimode cache of claim 7 wherein said predefined memory block is in said cache mode following a reset operation.

10. The multimode cache of claim 7 wherein accesses are in word-length units when said predefined memory block is in said SRAM mode.

11. The multimode cache of claim 7 wherein, with said predefined memory block in said flush mode, access to a cache set that has been modified since a previous access causes the modified cache set to be written to main memory.

12. The multimode cache of claim 7 wherein, with said predefined memory block in said invalidate mode, all cache lines are invalidated and all memory access is directed to main memory.

* * * * *